(12) United States Patent
Kumai

(10) Patent No.: US 8,724,056 B2
(45) Date of Patent: May 13, 2014

(54) POLARIZING ELEMENT, LIQUID CRYSTAL DEVICE, AND ELECTRONIC APPARATUS

(75) Inventor: Yoshitomo Kumai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 35 days.

(21) Appl. No.: 13/536,853

(22) Filed: Jun. 28, 2012

(65) Prior Publication Data

US 2013/0002999 A1    Jan. 3, 2013

(30) Foreign Application Priority Data

Jun. 30, 2011  (JP) ................. 2011-146016

(51) Int. Cl.
*G02F 1/1335*    (2006.01)

(52) U.S. Cl.
USPC ........................................................ 349/97

(58) Field of Classification Search
USPC ........................................................ 349/97
See application file for complete search history.

(56) References Cited

U.S. PATENT DOCUMENTS

| | | | |
|---|---|---|---|
| 4,304,584 A | 12/1981 | Borrelli et al. | |
| 5,943,156 A | 8/1999 | Komuro et al. | |
| 6,221,543 B1 * | 4/2001 | Guehler et al. | 430/7 |
| 7,019,903 B2 | 3/2006 | Berger et al. | |
| 2004/0095644 A1 * | 5/2004 | Berger et al. | 359/490 |

FOREIGN PATENT DOCUMENTS

| | | |
|---|---|---|
| JP | 56-169140 | 12/1981 |
| JP | 11-14829 | 1/1999 |
| JP | 2004-523804 | 8/2004 |
| JP | 2004-256915 | 9/2004 |

* cited by examiner

*Primary Examiner* — Phu Vu
(74) *Attorney, Agent, or Firm* — Workman Nydegger

(57) ABSTRACT

A polarizing element includes a plurality of first needle-shaped particles that have transmittance for first polarized light, which is in a first polarization state, that is different from transmittance for second polarized light, which is in a second polarization state different from the first polarization state, in a first wavelength region and a plurality of second needle-shaped particles that have transmittance for the first polarized light that is different from transmittance for the second polarized light, in a second wavelength region different from the first wavelength region.

19 Claims, 5 Drawing Sheets

POLARIZING ELEMENT, LIQUID CRYSTAL DEVICE, AND ELECTRONIC APPARATUS

The entire disclosure of Japanese Patent Application No. 2011-146016, filed Jun. 30, 2011 is expressly incorporated by reference herein.

BACKGROUND

1. Technical Field

The present invention relates to a polarizing element, a liquid crystal device, and an electronic apparatus.

2. Related Art

As one type of polarizing element, polarizing glass is known. Since the polarizing glass can be configured by using only inorganic materials, compared to a polarizing plate containing organic materials, the degradation with respect to light is markedly low. Thus, the polarizing glass has attracted attention in recent years as an optical device that is useful for a liquid crystal projector in which luminance increases are progressing.

As general polarizing glass, polarizing glass disclosed in JP-A-56-169140 is known. A method of manufacturing the polarizing glass is as follows.

(1) A glass product having a desired shape is produced from a composition that contains at least one halide selected from the group consisting of a chloride, a bromide, and an iodide and silver.

(2) The glass product is heated up to a temperature that is higher than the strain point but is not higher than the softening point of the glass by about 50° C. over a period that is sufficient for generating crystals of AgCl, AgBr, or AgI in the glass product, whereby a crystal containing product is produced.

(3) The crystal containing product is stretched under stress at a temperature that is higher than the annealing point but is lower than a temperature at which the glass presents a viscosity of about 108 poises such that the crystal stretches at the aspect ratio of at least 5:1.

(4) The product is exposed to a reducing atmosphere at a temperature that is higher than about 250° C. but is not higher than the annealing point of the glass by about 25° C. over a period that is sufficient for developing a chemical reducing surface layer on the product. Here, at least some of the stretched halide silver particles are reduced to silver elements.

In addition, in JP-A-2004-256915, particles that have an absorption peak in the visible region and have a particle diameter of about several nm to several tens of mm, that is, so-called nanoparticles are disclosed. More specifically, gold particles having an extremely high absorption wavelength of 530 nm and silver particles having an extremely high absorption wavelength of 420 nm are disclosed.

In the manufacturing method disclosed in JP-A-56-169140, halides uniformly educe in the glass product, but only halides located on the surface layer of the glass product are reduced in reducing process. Accordingly, halides remain in the center portion of the glass product in the thickness direction. As a result, the transmittance of the polarizing element decreases, and, in a case where the polarizing element is used in a liquid crystal display device or the like, there is concern that a sufficient brightness level cannot be acquired.

In addition, many of general liquid crystal display devices for full-color display, for example, include color filters configured by coloring material layers of a plurality of types of red (R), green (G), and blue (B). Generally, the polarizing characteristics of a polarizing element have wavelength dependence, and, in a case where one polarizing element is used, the polarizing characteristics for red light, green light and blue light are different from each other. Accordingly, it is common to use a polarizing element that has an average polarizing characteristic for red light, green light, and blue light. In other words, the polarizing characteristics of the polarizing element are not optimized to any one of red light, green light, and blue light. As a result, there is a problem that a brightness level, contrast, and color reproducibility that are sufficient for a liquid crystal display device cannot be acquired.

In addition, in JP-A-2004-256915, nanoparticles having an absorption wavelength peak in a visible region are described to be used in a coating material, and the application of the nanoparticles to a polarizing element is not suggested.

SUMMARY

An advantage of some aspects of the invention is that it provides a polarizing element representing superior polarizing characteristics for a plurality of light beams having mutually different wavelength regions. In addition, a liquid crystal device having a superior display quality by using such a polarizing element is provided. Furthermore, an electronic apparatus including a liquid crystal device of such a type is provided.

An aspect of the invention is directed to a polarizing element including: a plurality of first needle-shaped particles that has transmittance for a first polarized light, which is in a first polarization state, that is different from transmittance for a second polarized light, which is in a second polarization state different from the first polarization state, in a first wavelength region; and a plurality of second needle-shaped particles that has transmittance for the first polarized light that is different from transmittance for the second polarized light, in a second wavelength region different from the first wavelength region.

According to the above-described polarizing element, by appropriately selecting the first wavelength region and the second wavelength region, the polarizing characteristics for each one of a plurality of color light beams can be improved. As a result, when the above-described polarizing element is used in a liquid crystal device, the display quality can be improved.

The above-described polarizing element may be configured such that a ratio between the transmittance of the plurality of first needle-shaped particles for the first polarized light and the transmittance of the plurality of first needle-shaped particles for the second polarized light in the first wavelength region is different from a ratio between the transmittance of the plurality of first needle-shaped particles for the first polarized light and the transmittance of the plurality of first needle-shaped particles for the second polarized light in the second wavelength region, and a ratio between the transmittance of the plurality of second needle-shaped particles for the first polarized light and the transmittance of the plurality of second needle-shaped particles for the second polarized light in the first wavelength region is different from a ratio between the transmittance of the plurality of second needle-shaped particles for the first polarized light and the transmittance of the plurality of second needle-shaped particles for the second polarized light in the second wavelength region.

According to such a configuration, the ratio between the transmittance of the plurality of first needle-shaped particles for the first polarized light and the transmittance for the second polarized light thereof and the ratio between the transmittance of the plurality of second needle-shaped particles for the first polarized light and the transmittance for the second polarized light thereof can be optimized for a specific wavelength region.

The above-described polarizing element may be configured such that the plurality of first needle-shaped particles has an absorption peak in the first wavelength region for one of the first polarized light and the second polarized light, and the plurality of second needle-shaped particles has an absorption peak in the second wavelength region for one of the first polarized light and the second polarized light.

According to such a configuration, by including the plurality of first needle-shaped particles and the plurality of second needle-shaped particles, there are absorption peaks in the first wavelength region and the second wavelength region, and therefore a polarizing element can be realized, which has superior polarizing characteristics in the first wavelength region and the second wavelength region.

The above-described polarizing element may be configured such that an extinction ratio of the first needle-shaped particles for the first wavelength region is higher than an extinction ratio of the second needle-shaped particles for the first wavelength region, and an extinction ratio of the second needle-shaped particles for the second wavelength region is higher than an extinction ratio of the first needle-shaped particles for the second wavelength region.

According to such a configuration, an extinction ratio of the first needle-shaped particles for the first wavelength region is higher than an extinction ratio of the first needle-shaped particles for the first wavelength region, and an extinction ratio of the second needle-shaped particles for the second wavelength region is higher than an extinction ratio of the first needle-shaped particles for the second wavelength region, whereby a polarizing element can be realized which has superior polarizing characteristics for the first wavelength region and the second wavelength region.

The above-described polarizing element may be configured such that the plurality of first needle-shaped particles and the plurality of second needle-shaped particles are aligned in an approximately one direction in a base material.

According to such a configuration, since the polarizing layer can be formed on the base material in the state in which the first needle-shaped particles and the second needle-shaped particles are mixed in one base material, the manufacturing process can be simplified.

The above-described polarizing element may be configured such that the plurality of first needle-shaped particles is aligned in an approximately one direction in a first base material, the plurality of second needle-shaped particles is aligned in an approximately one direction in a second base material, and the first base material is disposed on the second base material.

According to such a configuration, since a polarizing layer including the plurality of first needle-shaped particles arranged in an approximately one direction and a polarizing layer including the plurality of second needle-shaped particles arranged in an approximately one direction can be individually formed, the alignment of the needle-shaped particles in each layer can be improved.

In the above-described polarizing element, it is preferable that one needle-shaped particle that is included in the plurality of first needle-shaped particles or in the plurality of second needle-shaped particles is configured by a single metal substance or composite metal in which a surface of a first metal is covered with a second metal.

According to such a configuration, by appropriately selecting the type of the metal substance or the composite metal, a polarizing element having desired polarizing characteristics can be realized.

In the above-described polarizing element, it is preferable that a material configuring the plurality of first needle-shaped particles includes a material that is different from a material configuring the plurality of second needle-shaped particles.

According to such a configuration, by appropriately selecting the type of material of each needle-shaped particle, a polarizing element having desired polarizing characteristics can be realized.

In the above-described polarizing element, it is preferable that a plurality of third needle-shaped particles that have transmittance for the first polarized light different from transmittance for the second polarized light in a third wavelength region is further included, the first wavelength region is present in a red wavelength region, the second wavelength region is present in a green wavelength region, and the third wavelength region is present in a blue wavelength region.

According to such a configuration, for example, a polarizing element that is very appropriate to a liquid crystal device including a red pixel, a green pixel, and a blue pixel can be realized.

Another aspect of the invention is directed to a liquid crystal device including: a liquid crystal panel in which a liquid crystal is interposed between substrates of one pair; a color filter; and a polarizing element that is arranged on at least one face of the liquid crystal panel, wherein the polarizing element is the above-described polarizing element.

According to the above-described liquid crystal device, since the above-described polarizing element is included, a liquid crystal device having a superior display quality can be realized.

Still another aspect of the invention is directed to an electronic apparatus including the above-described liquid crystal device.

According to the above-described electronic apparatus, since the above-described liquid crystal device is included, an electronic apparatus including a liquid crystal display unit having a superior display quality can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to FIG. 1 and FIGS. 2A to 2C.

Figure 1:
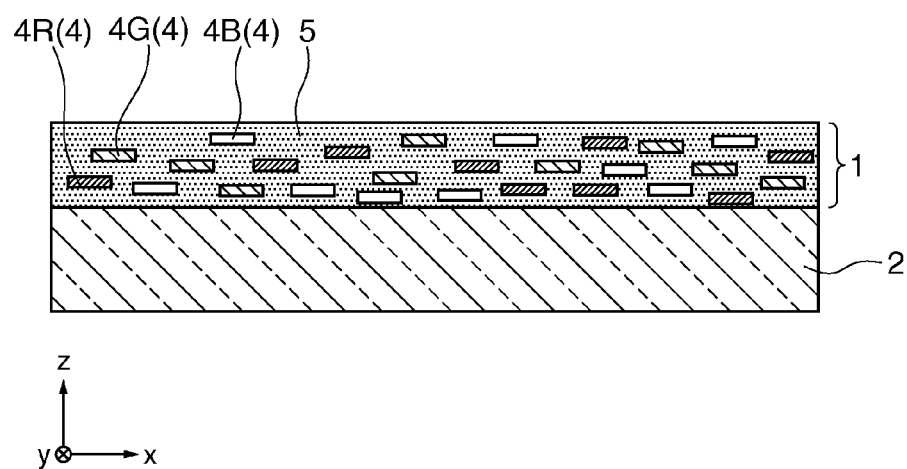
FIG. 1 is a cross-sectional view showing a polarizing element according to a first embodiment of the invention.
Figure 2A:
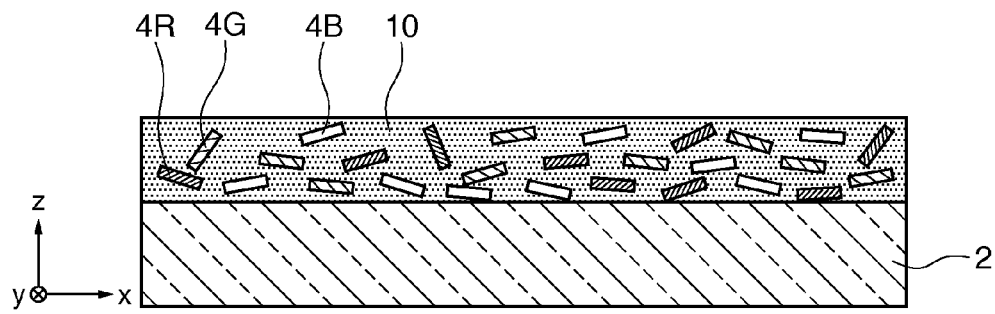
FIGS. 2A to 2C are cross-sectional views showing the process of manufacturing the polarizing element according to this embodiment in order.
Figure 2B:
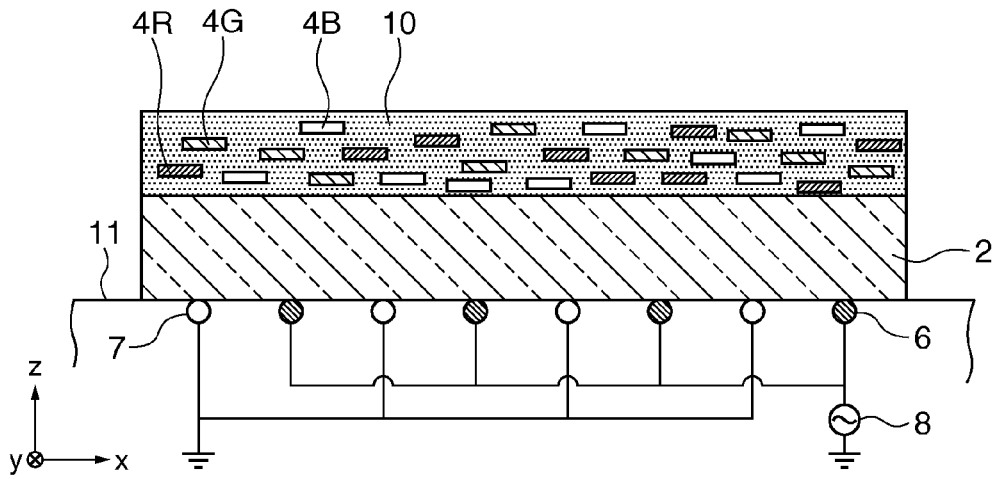
Figure 2C:
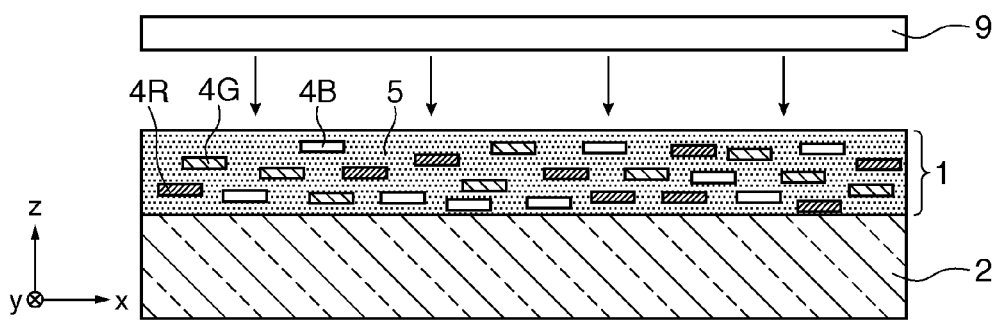

FIG. 1 is a cross-sectional view showing a polarizing element according to this embodiment. FIGS. 2A to 2C are cross-sectional views showing the process of manufacturing the polarizing element according to this embodiment in order.

In the following drawings, in order to allow each constituent element to be visually recognized in an easy manner, the scale of the size of the constituent element may be differently illustrated.

The polarizing element 1 according to this embodiment, as shown in FIG. 1, is supported by a glass substrate 2 as a base material. A specific material of the glass substrate 2 is not particularly limited, and any type of known glass substrate may be used. In addition, as long as the substrate has a light transmitting property, it is not limited to a glass substrate, and a quartz crystal substrate, a sapphire substrate, a resin substrate, or the like may be used. In a case where heat resistance is required for the polarizing element 1, it is preferable that a substrate of an inorganic system is used.

The polarizing element 1 has such characteristics for a specific wavelength region that the transmittance for first polarized light that is in a first polarized state is different from that for second polarized light that is in a second polarized state different from the first polarized state. In other words, for a specific wavelength region, the polarizing element has characteristics in which the first polarized light is transmitted, and the second polarized light is absorbed. The polarizing element 1 according to this embodiment is configured by a single layer. The polarizing element 1 is acquired by dispersing a plurality of nanorods 4 (needle-shaped particles) formed from gold (Au), silver (Ag), or the like into a light-transmissive base material 5 containing an inorganic material as a main raw material, for example, a base material 5 that is formed from a silicon oxide.

For example, each nanorod 4 has a dimension in the range of about several nm to several tens of nm in the shorter axis direction and a dimension in the range of about several tens of nm to 100 nm in the longer axis direction. The nanorod 4 has a characteristic that the ratio between the transmittance for the first polarized light and the transmittance for the second polarized light in a first wavelength region is different from the ratio between the transmittance for the first polarized light and the transmittance for the second polarized light in a second wavelength region that is different from the first wavelength region. In other words, the nanorod 4 has a characteristic that an absorption spectrum for a polarization component whose direction of the oscillation coincides with the direction of the shorter axis of the nanorod 4 is different from an absorption spectrum for a polarization component whose direction of the oscillation coincides with the direction of the longer axis of the nanorod 4. In the case of this embodiment, inside the polarizing element 1, nanorods 4 of three types to be described later are mixed, and the nanorods 4 of the three types have mutually different absorption peak wavelengths. The nanorods 4 of the three types are aligned in approximately the same direction. Here, the principal face of the glass substrate 2 is set as the xy plane, and the alignment direction of the nanorod 4 is set as the X axis direction.

The nanorods 4 of the three types are a silver nanorod 4B, a gold nanorod 4G, and a gold-core silver-shell nanorod 4R. The silver nanorod 4B and the gold nanorod 4G are composed of a silver simple substance and a gold simple substance, respectively. On the other hand, the gold-core silver-shell nanorod 4R is composed of composite metal in which the surface of a needle-shaped crystal formed from gold (first metal) is coated with silver (second metal).

As an example of the size of each nanorod 4, the silver nanorod 4B, for example, has a dimension of 40 nm in the longer axis direction, a dimension of 5 nm in the shorter axis direction, and an aspect ratio of 8. In addition, the gold nanorod 4G, for example, has a dimension of 15 nm in the longer axis direction, a dimension of 5 nm in the shorter axis direction, and an aspect ratio of 3. The gold-core silver-shell nanorod 4R, for example, has a dimension of 24 nm in the longer axis direction, a dimension of 12 nm in the shorter axis direction, and an aspect ratio of 2. Here, the aspect ratio is the ratio of the dimension of the nanorod 4 in the longer axis direction to the dimension in the shorter axis direction.

The silver nanorod 4B has an absorption peak wavelength of 410 nm (blue wavelength region) for a polarization component whose direction of oscillation coincides with the shorter axis direction. For example, the blue wavelength region is a third wavelength region. The gold nanorod 4G has an absorption peak wavelength of 530 nm (green wavelength region) for a polarization component whose direction of oscillation coincides with the shorter axis direction. For example, the green wavelength region is a second wavelength region. The gold-core silver-shell nanorod 4R has an absorption peak wavelength of 650 nm (red wavelength region) for a polarization component whose direction of oscillation coincides with the longer axis direction. For example, the red wavelength region is a first wavelength region.

Accordingly, the silver nanorod 4B represents characteristics of absorbing a polarization component whose direction of oscillation coincides with the shorter axis direction and transmitting a polarization component whose direction of oscillation coincides with the longer axis direction, mainly for light of the blue wavelength region. In addition, the gold nanorod 4G represents characteristics of absorbing a polarization component whose direction of oscillation coincides with the shorter axis direction and transmitting a polarization component whose direction of oscillation coincides with the longer axis direction, mainly for light of the green wavelength region. The gold-core silver-shell nanorod 4R represents characteristics of absorbing a polarization component whose direction of oscillation coincides with the longer axis direction and transmitting a polarization component whose direction of oscillation coincides with the shorter axis direction, mainly for light of the red wavelength region. Accordingly, the silver nanorod 4B, the gold nanorod 4G, and the gold-core silver-shell nanorod 4R do not interfere with each other, and the polarizing element 1 serves as a polarizing element having improved polarizing characteristics for light of the blue wavelength region, light of the green wavelength region, and light of the red wavelength region.

As described above, of the first polarized light and the second polarized light, the oscillation direction of the polarization component for which the silver nanorod 4B represents the absorption peak wavelength and the oscillation direction of the polarization component for which the gold-core silver-shell nanorod 4R represents the absorption peak wavelength are perpendicular to each other. In addition, of the first polarized light and the second polarized light, the oscillation direction of the polarization component for which the gold nanorod 4G represents the absorption peak wavelength and the oscillation direction of the polarization component for which the gold-core silver-shell nanorod 4R represents the absorption peak wavelength are perpendicular to each other. Accordingly, in a case where the silver nanorod 4B, the gold nanorod 4G, and the gold-core silver-shell nanorod 4R are aligned in the same direction in the polarizing element 1, the oscillation directions of the blue light and the green light transmitting through the polarizing element 1 are different from the oscillation direction of the red light transmitting through the polarizing element 1. However, in a case where the polarizing element 1 is used in a liquid crystal device, by using the polarizing element 1 according to this embodiment on the light incident side and the light outgoing side of a liquid crystal panel, even when the transmitted polarization components of the blue light, the green light, and the red light are different from each other, only the polarization states of the inside of the liquid crystal panel are different from each other, whereby there is no problem in display.

Hereinafter, a method of manufacturing the polarizing element 1 having the above-described configuration will be described with reference to FIGS. 2A to 2C.

As shown in FIG. 2A, the upper side of a glass substrate 2 is coated with an organic solvent solution 10 containing silver nanorods 4B, gold nanorods 4G, and gold-core silver-shell nanorods 4R (coating process). As a unit that coats a polarizing layer forming material 4A, a known printing technique or the like can be used. The organic solvent solution 10 is acquired by dissolving polysilazane, which is a raw material of a silicon oxide, into an arbitrary organic solvent. In the step in which coating with the organic solvent solution 10 is performed, a plurality of the silver nanorods 4B, a plurality of the gold nanorods 4G, and a plurality of the gold-core silver-shell nanorods 4R face random directions.

Next, as shown in FIG. 2B, an electric field is applied to the organic solvent solution 10 in a direction parallel to the x axis (electric field applying process). At this time, the glass substrate 2 is placed on a stage 11 on which a plurality of first electrodes 6 and a plurality of second electrodes 7 are alternately arranged. Although not shown in FIG. 2B, the first electrode 6 and the second electrode 7 have a band shape and extend in the y axis direction. A high frequency power source 8 is connected to the first electrodes 6, and the second electrodes 7 are grounded. In this state, when a high-frequency voltage is applied between the first electrode 6 and the second electrode 7, an electric field is generated in a direction parallel to the x axis inside the organic solvent solution 10. All the silver nanorod 4B, the gold nanorod 4G, and the gold-core silver-shell nanorod 4R have a needle shape, and polarization occurs in each nanorod 4. Accordingly, each nanorod 4 is aligned such that the longer axis direction thereof is along the direction of the electric field.

Next, as shown in FIG. 2C, the organic solvent solution 10 is burned, for example, by using an oven 9 or the like (burning process). Accordingly, the organic solvent contained in the organic solvent solution 10 is removed, and polysilazane acts with a moisture or oxygen contained in the air and is solidified so as to be changed to a silicon oxide (base material 5). At this time, the silver nanorods 4B, the gold nanorods 4G, and the gold-core silver-shell nanorods 4R are fixed in a state of being aligned in approximately the same direction.

The polarizing element 1 according to this embodiment is completed through the above-described processes.

Commonly, a general polarizing element has a broad polarizing characteristic for the wavelength of light, and the polarizing characteristic is not optimized for light of each color. Accordingly, for example, in case where such a polarizing element is used in a liquid crystal device, there are problems in display such as a decrease in the luminance or contrast, and degradation of color reproducibility.

In contrast to this, in the polarizing element 1 according to this embodiment, the silver nanorod 4B has a transmittance for the first polarized light that is different from that for the second polarized light in the blue wavelength region, the gold nanorod 4G has a transmittance for the first polarized light that is different from that for the second polarized light in the green wavelength region, and the gold-core silver-shell nanorod 4R has a transmittance for the first polarized light that is different from that for the second polarized light in the red wavelength region.

More specifically, in the blue wavelength region, the silver nanorod 4B has an absorption peak wavelength for a polarization component oscillating in the direction of the shorter axis and transmits a polarization component that oscillates in the direction of the longer axis. In the green wavelength region, the gold nanorod 4G has an absorption peak wavelength for a polarization component oscillating in the direction of the shorter axis and transmits a polarization component that oscillates in the direction of the longer axis. In the red wavelength region, the gold-core silver-shell nanorod 4R has an absorption peak wavelength for a polarization component oscillating in the direction of the longer axis and transmits a polarization component that oscillates in the direction of the shorter axis.

Here, in a predetermined wavelength band, a value acquired by dividing the transmittance of a polarization component that is not absorbed by the gold-core silver-shell nanorod 4R by the transmittance of a polarization component to be absorbed by the gold-core silver-shell nanorod 4R is defined as an extinction ratio of the gold-core silver-shell nanorod 4R for the predetermined wavelength band. The extinction ratio of the silver nanorod 4B and the extinction ratio of the gold nanorod 4G are similarly defined. In the red wavelength region, the extinction ratio of the gold-core silver-shell nanorod 4R is higher than the extinction ratio of the silver nanorod 4B and the extinction ratio of the gold nanorod 4G. In addition, in the green wavelength region, the extinction ratio of the gold nanorod 4G is higher than the extinction ratio of the silver nanorod 4B and the extinction ratio of the gold-core silver-shell nanorod 4R. Furthermore, in the blue wavelength region, the extinction ratio of the silver nanorod 4B is higher than the extinction ratio of the gold nanorod 4G and the extinction ratio of the gold-core silver-shell nanorod 4R.

In addition, in a predetermined wavelength band, of the first polarized light and the second polarized light, the transmittance of a polarization component other than the polarization component to be absorbed by the gold-core silver-shell nanorod 4R may be regarded as the transmittance of the polarization component transmitted by the gold-core silver-shell nanorod 4R for light of the predetermined wavelength band. Furthermore, in a predetermined wavelength band, of the first polarized light and the second polarized light, the transmittance of the polarization component absorbed to be by the gold-core silver-shell nanorod 4R may be regarded as the transmittance of the polarization component absorbed by the gold-core silver-shell nanorod 4R for light of the predetermined wavelength band.

Similarly, in a predetermined wavelength band, of the first polarized light and the second polarized light, the transmittance of a polarization component other than the polarization component to be absorbed by the gold nanorod 4G may be regarded as the transmittance of the polarization component transmitted by the gold nanorod 4G for light of the predetermined wavelength band. In addition, in a predetermined wavelength band, of the first polarized light and the second polarized light, the transmittance of the polarization component to be absorbed by the gold nanorod 4G may be regarded as the transmittance of the polarization component absorbed by the gold nanorod 4G for light of the predetermined wavelength band.

Similarly, in a predetermined wavelength band, of the first polarized light and the second polarized light, the transmittance of a polarization component other than the polarization component to be absorbed by the silver nanorod 4B may be regarded as the transmittance of the polarization component transmitted by the silver nanorod 4B for light of the predetermined wavelength band. In addition, in a predetermined wavelength band, of the first polarized light and the second polarized light, the transmittance of the polarization component to be absorbed by the silver nanorod 4B may be regarded as the transmittance of the polarization component absorbed by the silver nanorod 4B for light of the predetermined wavelength band.

Accordingly, one polarizing element has superior polarizing characteristics for each color light beam of the blue light beam, the green light beam, and the red light beam. As a result, in a case where the polarizing element 1 according to this embodiment is used in a liquid crystal device that includes a blue pixel, a green pixel, and a red pixel, the luminance, the contrast, the color reproducibility, and the like can be improved, whereby the display quality can be improved.

Since the polarizing element 1 according to this embodiment has a configuration in which the silver nanorods 4B, the gold nanorods 4G, and the gold-core silver-shell nanorods 4R are mixed inside a single base material 5, the polarizing element 1 can be formed by using a solution acquired by mixing the above-described nanorods into polysilazane that becomes the base material 5 later. Accordingly, the manufacturing process of the polarizing element 1 can be simplified. In addition, since all the composition materials of the polarizing element 1 are inorganic materials, a polarizing element having superior heat resistance can be realized.

In addition, the polarizing element 1 according to this embodiment can be easily manufactured by using a known thin-film forming technique as described above, the polarizing element can be formed to be thinner than an existing polarizing element.

Second Embodiment

Hereinafter, a second embodiment of the invention will be described with reference to FIG. 3.

The basic configuration of the polarizing element according to this embodiment is similar to that according to the first embodiment, but only the configuration of the polarizing layer is different from that of the first embodiment.

Figure 3:
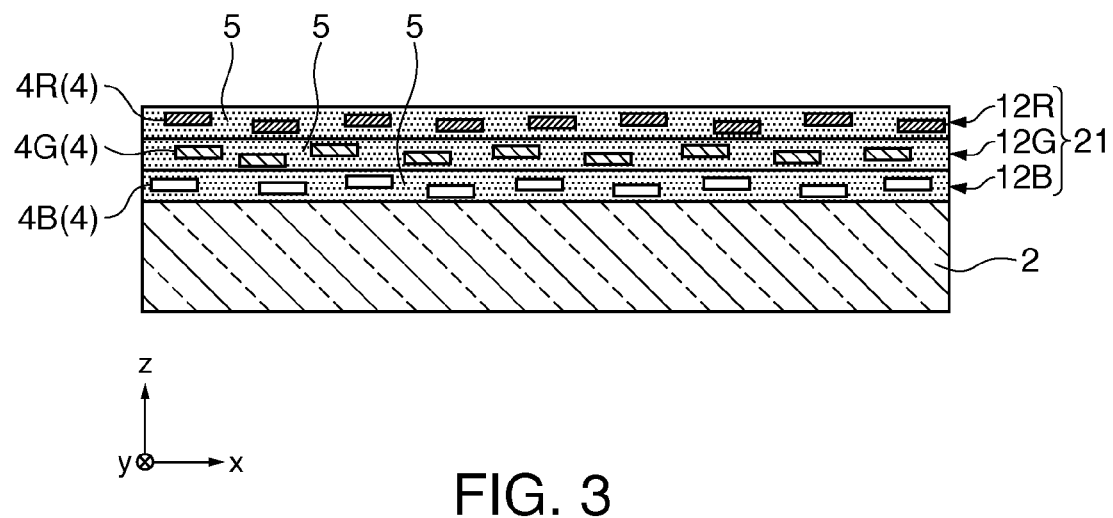
FIG. 3 is a cross-sectional view showing a polarizing element according to a second embodiment of the invention.

FIG. 3 is a cross-sectional view showing the polarizing element according to this embodiment.

In FIG. 3, the same reference numeral is assigned to the constituent element that is common to that of the first embodiment shown in FIG. 1, and detailed description thereof will not be presented here.

As the polarizing element 1 according to the first embodiment, the polarizing element 1 of one layer is formed on the glass substrate 2. In contrast to this, the polarizing element 21 according to this embodiment, as shown in FIG. 3, includes a glass substrate 2 (base material) as a base material and a polarizing layer 12B, a polarizing layer 12G, and a polarizing layer 12R that are stacked on one face of the glass substrate 2. The polarizing layers of three layers will be referred to as a first polarizing layer 12B, a second polarizing layer 12G, and a third polarizing layer 12R in order from the glass substrate 2 side (lower-layer side).

In the first polarizing layer 12B, a plurality of silver nanorods 4B is dispersed in a base material 5 formed from a silicon oxide as a first base material. The plurality of silver nanorods 4B is aligned in approximately the same direction within a principal plane of the glass substrate 2. Here, the alignment direction of the silver nanorod 4B is assumed to be in the x axis direction. In the second polarizing layer 12G, a plurality of gold nanorods 4G is dispersed in a base material 5 formed from a silicon oxide as a second base material. The plurality of gold nanorods 4G is aligned in approximately the same direction, that is, the x axis direction. In the third polarizing layer 12R, a plurality of gold-core silver-shell nanorods 4R is dispersed in a base material 5 formed from a silicon oxide as a third base material. The plurality of gold-core silver-shell nanorods 4R is aligned in approximately the same direction, that is, the x axis direction.

The size and the absorption characteristics of each nanorod 4 are as described in the first embodiment. In other words, the silver nanorod 4B has an absorption peak wavelength of 410 nm (blue wavelength region) for a polarization component whose direction of oscillation coincides with the shorter axis direction. In addition, the gold nanorod 4G has an absorption peak wavelength of 530 nm (green wavelength region) for a polarization component whose direction of oscillation coincides with the shorter axis direction. The gold-core silver-shell nanorod 4R has an absorption peak wavelength of 650 nm (red wavelength region) for a polarization component whose direction of oscillation coincides with the longer axis direction.

The polarizing element 21 according to this embodiment, similarly to the polarizing element 1 according to the first embodiment, serves as a polarizing element having improved polarizing characteristics for light of the blue wavelength region, light of the green wavelength region, and light of the red wavelength region. In addition, according to this embodiment, in a state in which nanorods 4 of one type are contained in polysilazane as a raw material of the base material 5, the first polarizing layer 12B, the second polarizing layer 12G, and the third polarizing layer 12R can be formed on the glass substrate 2 one layer each time. Accordingly, the alignment of the nanorods placed inside each polarizing layer can be improved.

Third Embodiment

Hereinafter, a third embodiment of the invention will be described with reference to FIG. 4.

The basic configuration of the polarizing element according to this embodiment is similar to that according to the second embodiment, but only the configuration of the third polarizing layer is different from that of the second embodiment.

Figure 4:
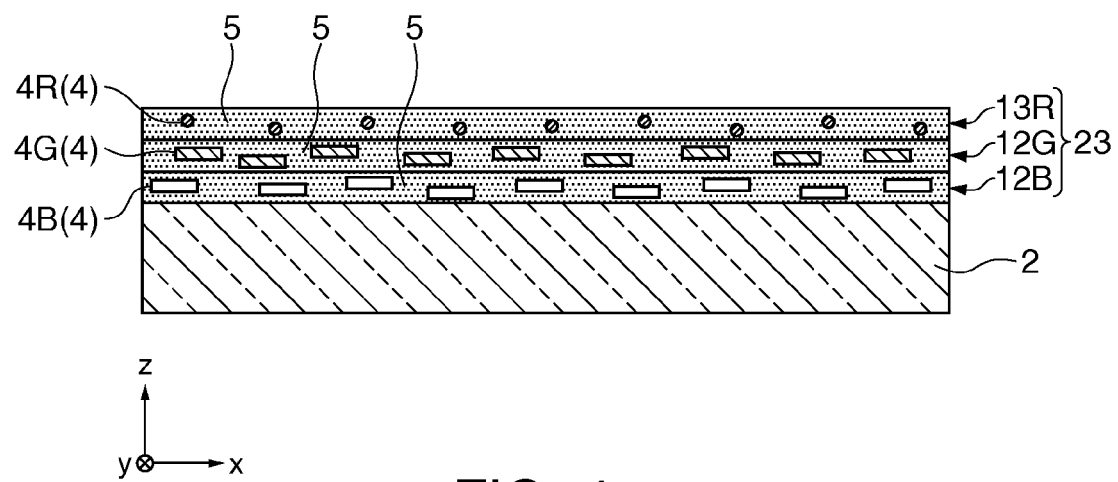
FIG. 4 is a cross-sectional view showing a polarizing element according to a third embodiment of the invention.

FIG. 4 is a cross-sectional view showing the polarizing element according to this embodiment.

In FIG. 4, the same reference numeral is assigned to the constituent element that is common to that of the second embodiment shown in FIG. 3, and detailed description thereof will not be presented here.

The polarizing element 23 according to this embodiment, as shown in FIG. 4, includes a glass substrate 2 (base material) as a base material and a polarizing layer 12B, a polarizing layer 12G, and a polarizing layer 13R that are stacked on one face of the glass substrate 2. A first polarizing layer 12B, a second polarizing layer 12G, and a third polarizing layer 13R are stacked in this order from the glass substrate 2 side (lower-layer side).

The configurations of the first polarizing layer 12B and the second polarizing layer 12G are similar to those of the second embodiment. In the first polarizing layer 12B, a plurality of silver nanorods 4B is dispersed in a base material 5. The plurality of silver nanorods 4B is aligned in approximately the same direction within a principal plane of the glass substrate 2. Here, the alignment direction of the silver nanorod 4B is assumed to be in the x axis direction. In the second polarizing layer 12G, a plurality of gold nanorods 4G is dispersed in a base material 5. The plurality of gold nanorods 4G is aligned in approximately the same direction, that is, the x axis direction.

In the polarizing element 23 according to this embodiment, the configuration of the third polarizing layer 13R is different from that according to the second embodiment. In the third polarizing layer 12R, a plurality of gold-core silver-shell nanorods 4R is dispersed in the base material 5. The plurality of gold-core silver-shell nanorods 4R is aligned in approximately the same direction and in a direction that is perpendicular to the alignment direction of the silver nanorod 4B included in the first polarizing layer 12B and the alignment direction of the gold nanorod 4G of the second polarizing layer 12G, in other words, the y-axis direction. The setting of the coordinate axes is the same as that of the first embodiment.

The polarizing element 23 according to this embodiment, similarly to the polarizing element 1 according to the first embodiment, serves as a polarizing element having improved polarizing characteristics for light of the blue wavelength region, light of the green wavelength region, and light of the red wavelength region.

As described in the first embodiment, of the first polarized light and the second polarized light, the oscillation direction of the polarization component for which the silver nanorod 4B represents the absorption peak wavelength and the oscillation direction of the polarization component for which the gold-core silver-shell nanorod 4R represents the absorption peak wavelength are perpendicular to each other. In addition, of the first polarized light and the second polarized light, the oscillation direction of the polarization component for which the gold nanorod 4G represents the absorption peak wavelength and the oscillation direction of the polarization component for which the gold-core silver-shell nanorod 4R represents the absorption peak wavelength are perpendicular to each other. In this embodiment, since the alignment direction of the gold-core silver-shell nanorod 4R and the alignment direction of the silver nanorod 4B and the gold nanorod 4G are perpendicular to each other, the oscillation direction of the polarization component transmitted through the polarizing element 23 for all the color light beams is configured to coincide with each other.

Liquid Crystal Device

Hereinafter, a liquid crystal device according to an embodiment of the invention will be described with reference to FIGS. 5 and 6.

In this embodiment, a liquid crystal display device of an active matrix type that uses thin film transistors (TFT; hereinafter, simply referred to as a TFT) as pixel switching elements will be described as an example. FIG. 5 is a plan view of the liquid crystal display device according to this embodiment viewed together with the constituent elements from the side of an opposing substrate. FIG. 6 is a cross-sectional view taken along line H-H' shown in FIG. 5.

Figure 5:
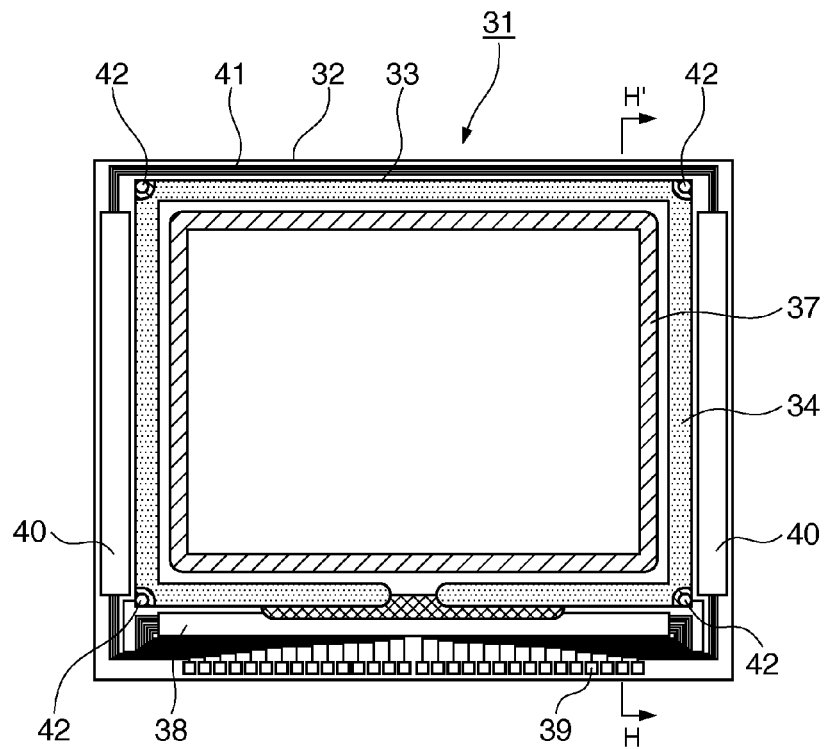
FIG. 5 is a plan view showing a liquid crystal device according to an embodiment of the invention.
Figure 6:
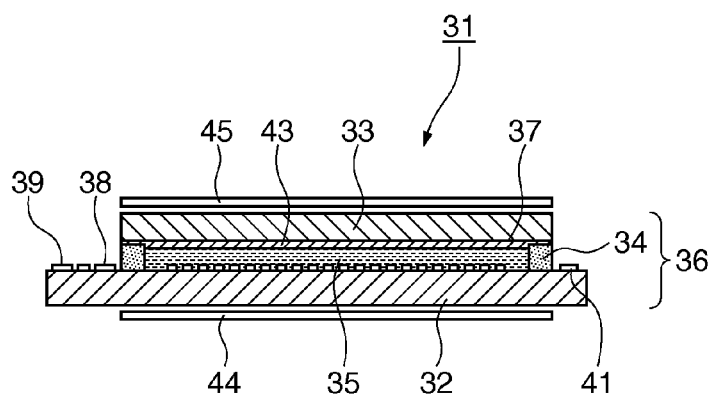
FIG. 6 is a cross-sectional view taken along line H-H' shown in FIG. 5.

As shown in FIGS. 5 and 6, the liquid crystal display device 31 according to this embodiment includes a liquid crystal panel 36 that is formed by bonding a TFT array substrate 32 and an opposing substrate 33 using a sealing material 34 and sealing a liquid crystal layer 35 in an area partitioned by the sealing material 34. The liquid crystal layer 35 is composed of a liquid crystal material having positive dielectric anisotropy. In an inner area of the area formed by the sealing material 34, a light shielding film (periphery-parted) 37 formed from a material having a light shielding property is formed.

In an peripheral circuit area located on the outer side of the sealing material 34, a data line driving circuit 38 and external circuit mounting terminals 39 are formed along one side of the TFT array substrate 32, and scanning line driving circuits 40 are formed along two sides adjacent to the one side. On one remaining side of the TFT array substrate 32, a plurality of wirings 41 used for connecting the scanning line driving circuits 40 disposed on both sides of a display region is disposed. In addition, on the corners of the opposing substrate 33, inter-substrate conduction members 42 that are used for forming electric conduction between the TFT array substrate 32 and the opposing substrate 33 are disposed.

On a face of the opposing substrate 33, which is located on the liquid crystal layer 35 side, a color filter 43 is formed. The color filter 43 includes a red coloring material layer, a green coloring material layer, and a blue coloring material layer in correspondence with a plurality of sub pixels arranged in a matrix pattern. On the light incident side and the light outgoing side of the liquid crystal panel 36, polarizing plates 44 and 45 are arranged, respectively. The polarizing plates 44 and 45 are the polarizing elements according to the first embodiment or the second embodiment.

According to this embodiment, by including the polarizing element according to the first embodiment or the second embodiment, a liquid crystal display device that can perform a bright and high-contrast display can be realized.

Electronic Apparatus

Hereinafter, an electronic apparatus according to an embodiment of the invention will be described with reference to FIG. 7.

Figure 7:
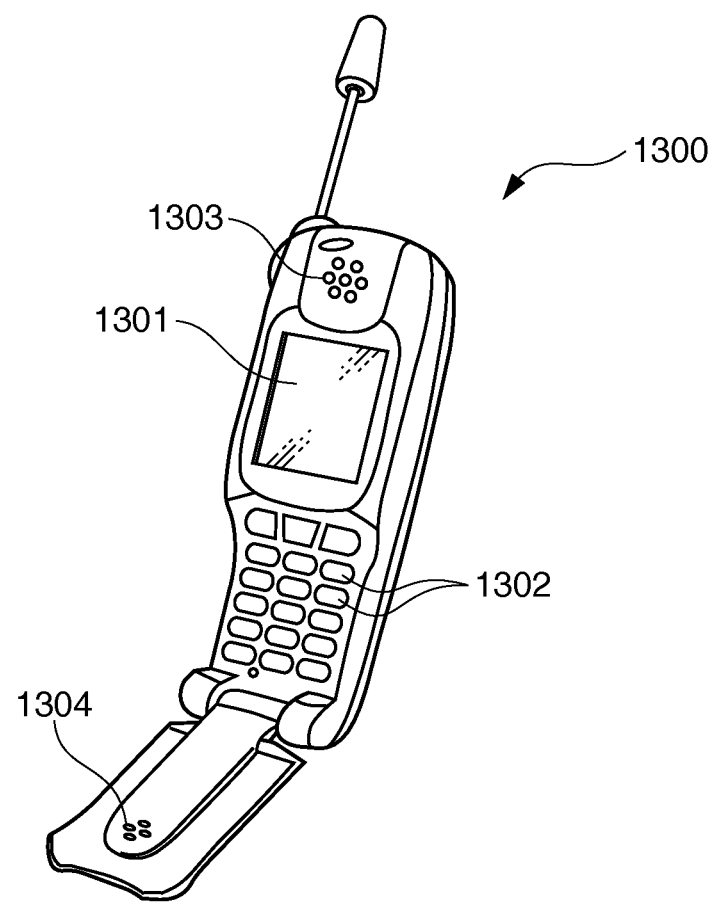
FIG. 7 is a plan view showing an electronic apparatus according to an embodiment of the invention.

FIG. 7 is a perspective view of a cellular phone including the liquid crystal display device according to the above-described embodiment. As shown in FIG. 7, the cellular phone 1300 (electronic apparatus) includes a plurality of operation buttons 1302, an ear piece 1303, a mouth piece 1304 and a display unit 1301 that is configured by the liquid crystal display device according to the above-described embodiment.

According to this embodiment, by including the liquid crystal display device according to the above-described embodiment as the display unit 1301, an electronic apparatus including the liquid crystal display unit having a superior display quality can be realized.

In addition, as specific examples of the electronic apparatus according to an embodiment of the invention, there are a projector, an electronic book, a personal computer, a digital still camera, a liquid crystal television set, a view finder-type or monitor direct viewing-type video cassette recorder, a car navigation equipment, a pager, an electric organizer, a calculator, a word processor, a workstation, a television telephone, a POS terminal, and an electronic apparatus including a touch panel, in addition to the above-described cellular phone.

The technical scope of the invention is not limited to the above-described embodiments, and various changes can be made therein in the range not departing from the concept of the invention.

For example, in the above-described embodiments, as a unit for realizing a polarizing element having superior polarizing characteristics for a plurality of wavelengths different from each other, the materials of nanorods are selected in accordance with the wavelengths like the silver nanorods, the gold nanorods, and the gold-core silver-shell nanorods. However, instead of this unit, the aspect ratio of the nanorod may be selected in accordance with the wavelength. By using such a unit, a polarizing element having superior polarizing characteristics for a plurality of wavelengths different from each other can be realized.

In addition, in the above-described embodiments, as the materials of the nanorods, gold and silver are used. However, the materials are not limited thereto. Thus, a semiconductor material may be used.

In addition, in the above-described embodiments, a polarizing element having absorption peaks in three wavelength regions is realized by using nanorods of three types. However, the invention is not limited thereto. For example, in a case where there are four color light beams such as a red light beam, a green light beam, a blue light beam, and a yellow light beam, nanorods of four types may be used, so that the polarizing element has absorption peaks in four wavelength regions in accordance with such colors.

In addition, even in a case where the number of color light beams configuring an image display is three, nanorods of two types may be used, so that the polarizing element has absorption peaks in two wavelength regions. In such a case, it is preferable that one wavelength region out of three wavelength regions configuring the display of an image overlaps any one of two absorption peak wavelengths of the polarizing element.

Furthermore, the wavelength regions are not limited to the blue wavelength region, the green wavelength region, and the red wavelength region. In addition, the composition material, the size, the manufacturing process, and the like of each portion of the polarizing element may be appropriately changed.

What is claimed is:

1. A polarizing element comprising:
    a first layer formed on a substrate, the first layer including:
    a plurality of first needle-shaped particles that has transmittance for a first polarized light having, a first polarization state, wherein the transmittance for the first polarized light is different from transmittance for a second polarized light in a second polarization state different from the first polarization state, in a first wavelength region; and
    a plurality of second needle-shaped particles that has transmittance for the first polarized light that is different from transmittance for the second polarized light, in a second wavelength region different from the first wavelength region,
    wherein both the plurality of first needle-shaped particles and the plurality of second needle-shaped particles are dispersed in the first layer, and
    wherein the plurality of first needle-shaped particles are comprised of a first material and the plurality of second needle-shaped particles are comprised of a second material that is different from the first material.

2. The polarizing element according to claim 1,
    wherein a ratio between the transmittance of the plurality of first needle-shaped particles for the first polarized light and the transmittance of the plurality of first needle-shaped particles for the second polarized light in the first wavelength region is different from a ratio between the transmittance of the plurality of first needle-shaped particles for the first polarized light and the transmittance of the plurality of first needle-shaped particles for the second polarized light in the second wavelength region, and
    wherein a ratio between the transmittance of the plurality of second needle-shaped particles for the first polarized light and the transmittance of the plurality of second needle-shaped particles for the second polarized light in the first wavelength region is different from a ratio between the transmittance of the plurality of second needle-shaped particles for the first polarized light and the transmittance of the plurality of second needle-shaped particles for the second polarized light in the second wavelength region.

3. The polarizing element according to claim 1,
    wherein the plurality of first needle-shaped particles has an absorption peak in the first wavelength region for one of the first polarized light and the second polarized light, and
    wherein the plurality of second needle-shaped particles has an absorption peak in the second wavelength region for one of the first polarized light and the second polarized light.

4. The polarizing element according to claim 1,
    wherein an extinction ratio of the first needle-shaped particles for the first wavelength region is higher than an extinction ratio of the second needle-shaped particles for the first wavelength region, and
    wherein an extinction ratio of the second needle-shaped particles for the second wavelength region is higher than an extinction ratio of the first needle-shaped particles for the second wavelength region.

5. The polarizing element according to claim 1, wherein the plurality of first needle-shaped particles and the plurality of second needle-shaped particles are aligned in an approximately one direction in a base material.

6. The polarizing element according to claim 1,
    wherein the plurality of first needle-shaped particles is aligned in an approximately one direction in a first base material,
    wherein the plurality of second needle-shaped particles is aligned in an approximately one direction in a second base material, and
    wherein the first base material is disposed on the second base material.

7. The polarizing element according to claim 1, wherein one needle-shaped particle that is included in the plurality of first needle-shaped particles or in the plurality of second needle-shaped particles is configured by a single metal substance or composite metal in which a surface of a first metal is covered with a second metal.

8. The polarizing element according to claim 1, wherein a material configuring the plurality of first needle-shaped particles includes a material that is different from a material configuring the plurality of second needle-shaped particles.

9. The polarizing element according to claim 1, further comprising a plurality of third needle-shaped particles that have transmittance for the first polarized light different from transmittance for the second polarized light in a third wavelength region,
    wherein the first wavelength region is present in a red wavelength region,
    wherein the second wavelength region is present in a green wavelength region, and
    wherein the third wavelength region is present in a blue wavelength region.

10. A liquid crystal device comprising:
    a liquid crystal panel in which a liquid crystal is interposed between substrates of one pair;
    a color filter, and
    a polarizing element that is arranged on at least one face of the liquid crystal panel;
    wherein polarizing element is the polarizing element according to claim 1.

11. A liquid crystal device comprising:
    a liquid crystal panel in which a liquid crystal is interposed between substrates of one pair;
    a color filter, and
    a polarizing element that is arranged on at least one face of the liquid crystal panel;
    wherein the polarizing element is the polarizing element according to claim 2.

12. A liquid crystal device comprising:
    a liquid crystal panel in which a liquid crystal is interposed between substrates of one pair;
    a color filter, and a polarizing element that is arranged on at least one face of the liquid crystal panel;

wherein the polarizing element is the polarizing element according to claim 3.

13. A liquid crystal device comprising:

a liquid crystal panel in which a liquid crystal is interposed between substrates of one pair;

a color filter, and a polarizing element that is arranged on at least one face of the liquid crystal panel;

wherein the polarizing element is the polarizing element according to claim 4.

14. A liquid crystal device comprising:

a liquid crystal panel in which a liquid crystal is interposed between substrates of one pair;

a color filter, and a polarizing element that is arranged on at least one face of the liquid crystal panel;

wherein the polarizing element is the polarizing element according to claim 5.

15. An electronic apparatus comprising:

the liquid crystal device according to claim 10.

16. An electronic apparatus comprising:

the liquid crystal device according to claim 11.

17. An electronic apparatus comprising:

the liquid crystal device according to claim 12.

18. An electronic apparatus comprising:

the liquid crystal device according to claim 13.

19. An electronic apparatus comprising:

the liquid crystal device according to claim 14.

* * * * *